United States Patent
Xu et al.

(10) Patent No.: US 12,556,900 B2
(45) Date of Patent: Feb. 17, 2026

(54) METHODS AND APPARATUSES FOR EVENT MONITORING

(71) Applicant: Telefonaktiebolaget LM Ericsson (publ), Stockholm (SE)

(72) Inventors: Wenliang Xu, Shanghai (CN); Juying Gan, Shanghai (CN); Yunjie Lu, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 18/542,533

(22) Filed: Dec. 15, 2023

(65) Prior Publication Data

US 2024/0121591 A1 Apr. 11, 2024

Related U.S. Application Data

(63) Continuation of application No. 17/268,445, filed as application No. PCT/CN2019/100844 on Aug. 15, 2019, now abandoned.

(30) Foreign Application Priority Data

Aug. 20, 2018 (WO) ................ PCT/CN2018/101379

(51) Int. Cl.
*H04W 8/08* (2009.01)
*H04W 60/04* (2009.01)
*H04W 76/11* (2018.01)

(52) U.S. Cl.
CPC ............. *H04W 8/08* (2013.01); *H04W 60/04* (2013.01); *H04W 76/11* (2018.02)

(58) Field of Classification Search
CPC ....... H04W 8/08; H04W 60/04; H04W 76/11; H04W 24/10; H04W 24/08; H04L 43/00; H04L 41/00
See application file for complete search history.

(56) References Cited

U.S. PATENT DOCUMENTS

2018/0069878 A1* 3/2018 Martini ............... H04L 61/4511
2018/0234291 A1 8/2018 Mathison et al.

FOREIGN PATENT DOCUMENTS

CN 107580324 A 1/2018

OTHER PUBLICATIONS

3GPP TS 23.502 V15.2.0, "3rd Generation Partnership Project; Technical Specification Group Services and System Aspects; Procedures for the 5G System; Stage 2 (Release 15)," Jun. 2018, 308 pages, 3GPP Organizational Partners (Year: 2018).*

(Continued)

*Primary Examiner* — Jinsong Hu
*Assistant Examiner* — Farideh Madani
(74) *Attorney, Agent, or Firm* — Nicholson De Vos Webster & Elliott LLP

(57) ABSTRACT

Method and apparatus in which a network exposure node receives, from a server, a first request for monitoring communication failure for at least one terminal device. The network exposure node obtains a connection identity (ID) for identifying a connection between the at least one terminal device and the server, based on the received first request. The network exposure node sends, to a subscriber management node or a policy decision node, a second request for monitoring communication failure for the at least one terminal device. The second request includes the obtained connection ID.

13 Claims, 13 Drawing Sheets

(56) References Cited

OTHER PUBLICATIONS

3GPP TR 29.890 V15.2.0, "3rd Generation Partnership Project; Technical Specification Group Core Network and Terminals; Study on Ct WG3 Aspects of 5G System Phase 1; (Release 15)," Jun. 2018, 157 pages, 3GPP Organizational Partners (Year: 2018).*
3GPP TR 29.890 V15.2.0, "3rd Generation Partnership Project; Technical Specification Group Core Network and Terminals; Study on Ct WG3 Aspects of 5G System Phase 1; (Release 15)," Jun. 2018, 157 pages, 3GPP Organizational Partners.
3GPP TS 23.501 V15.2.0, "3rd Generation Partnership Project; Technical Specification Group Services and System Aspects; System Architecture for the 5G System; Stage 2 (Release 15)," Jun. 2018, 217 pages, 3GPP Organizational Partners.
3GPP TS 23.502 V15.2.0, "3rd Generation Partnership Project; Technical Specification Group Services and System Aspects; Procedures for the 5G System; Stage 2 (Release 15)," Jun. 2018, 308 pages, 3GPP Organizational Partners.
3GPP TS 23.503 V15.2.0, "3rd Generation Partnership Project; Technical Specification Group Services and System Aspects; Policy and Charging Control Framework for the 5G System; Stage 2 (Release 15)," Jun. 2018, 67 pages, 3GPP Organizational Partners.
3GPP TS 23.682 V15.5.0, "3rd Generation Partnership Project; Technical Specification Group Services and System Aspects; Architecture enhancements to facilitate communications with packet data networks and applications (Release 15)," Jun. 2018, 125 pages, 3GPP Organizational Partners.
3GPP TS 29.122 V15.0.0, "3rd Generation Partnership Project; Technical Specification Group Core Network and Terminals; T8 reference point for Northbound APIs; (Release 15)," Jun. 2018, 255 pages, 3GPP Organizational Partners.
3GPP TS 29.154 V15.1.0, "3rd Generation Partnership Project; Technical Specification Group Core Network and Terminals; Service capability exposure functionality over NT reference point (Release 15)," Jun. 2018, 24 pages, 3GPP Organizational Partners.
3GPP TS 29.214 V15.4.0, "3rd Generation Partnership Project; Technical Specification Group Core Network and Terminals; Policy and Charging Control over Rx reference point (Release 15)," Jun. 2018, 89 pages, 3GPP Organizational Partners.
3GPP TS 29.272 V15.4.0, "3rd Generation Partnership Project; Technical Specification Group Core Network and Terminals; Evolved Packet System (EPS); Mobility Management Entity (MME) and Serving GPRS Support Node SGSN) related interfaces based on Diameter protocol (Release 15)," Jun. 2018, 168 pages, 3GPP Organizational Partners.
3GPP TS 29.336 V15.3.0, "3rd Generation Partnership Project; Technical Specification Group Core Network and Terminals; Home Subscriber Server (HSS) diameter interfaces for interworking with packet data networks and applications (Release 15)," Jun. 2018, 71 pages, 3GPP Organizational Partners.
3GPP TS 29.503 V15.0.0, "3rd Generation Partnership Project; Technical Specification Group Core Network and Terminals; 5G System; Unified Data Management Services; Stage 3 (Release 15)," Jun. 2018, 127 pages, 3GPP Organizational Partners.
3GPP TS 29.505 V15.0.0, "3rd Generation Partnership Project; Technical Specification Group Core Network and Terminals; 5G System; Usage of the Unified Data Repository services for Subscription Data; Stage 3 (Release 15)," Jun. 2018, 62 pages, 3GPP Organizational Partners.
3GPP TS 29.518 V15.0.0, "3rd Generation Partnership Project; Technical Specification Group Core Network and Terminals; 5G System; Access and Mobility Management Services; Stage 3 (Release 15)," Jun. 2018, 154 pages, 3GPP Organizational Partners.
3GPP TS 33.220 V15.2.0, "3rd Generation Partnership Project; Technical Specification Group Services and System Aspects; Generic Authentication Architecture (GAA); Generic Bootstrapping Architecture (GBA) (Release 15)," Jun. 2018, 93 pages, 3GPP Organizational Partners.
3GPP TS 33.501 V15.1.0, "3rd Generation Partnership Project; Technical Specification Group Services and System Aspects; Security architecture and procedures for 5G system (Release 15)," Jun. 2018, 152 pages, 3GPP Organizational Partners.
Ericsson, "Monitoring via PCRF," 6 p. 3GPP TSG-SA2 Meeting #108, S2-151409, Apr. 13-17, 2015, San Jose Del Cabo, Mexico.
Final Office Action, U.S. Appl. No. 17/268,445, Jun. 7, 2023, 12 pages.
Huawei et al., "Introduction of Monitoring Procedures," 11 pages, SA WG2 Meeting #108, S2-150875, Apr. 13-17, 2015, San Jose Del Cabo, Mexico.
International Preliminary Report on Patentability, PCT App. No. PCT/CN2019/100844, Mar. 4, 2021, 6 pages.
International Search Report and Written Opinion for International Application No. PCT/CN2019/100844, dated Nov. 15, 2019, 9 pages.
Non-Final Office Action, U.S. Appl. No. 17/268,445, Feb. 17, 2023, 12 pages.
Notice of Allowance, U.S. Appl. No. 17/268,445, Sep. 27, 2023, 9 pages.
Requirement for Restriction/Election, U.S. Appl. No. 17/268,445, Nov. 22, 2022, 8 pages.
Supplementary European search report and Search Opinion, EP App. No. 19851732.8, May 9, 2022, 26 pages.
Communication pursuant to Article 94(3) EPC, EP App. No. 19851732.8, Jul. 11, 2024, 12 pages.

* cited by examiner

METHODS AND APPARATUSES FOR EVENT MONITORING

CROSS-REFERENCE TO RELATED APPLICATIONS

This application is a continuation of application Ser. No. 17/268,445, filed Feb. 12, 2021, which is a National stage of International Application No. PCT/CN2019/100844, filed Aug. 15, 2019, which claims priority to International Application No. PCT/CN2018/101379, filed Aug. 20, 2018, which are hereby incorporated by reference.

TECHNICAL FIELD

Embodiments of the disclosure generally relate to communication, and, more particularly, to methods and apparatuses for event monitoring.

BACKGROUND

This section introduces aspects that may facilitate better understanding of the present disclosure. Accordingly, the statements of this section are to be read in this light and are not to be understood as admissions about what is in the prior art or what is not in the prior art.

Currently, 3rd generation partnership project (3GPP) system supports capability exposure towards the third party service capability server (SCS)/application server (AS). For example, in fourth generation (4G) communication technology, network capability exposure to non-3GPP domain is mainly used for machine-type communication (MTC) application and service capability exposure function (SCEF) is a 3GPP node interfacing with external SCS/AS and many southbound 3GPP nodes such as home subscriber server (HSS) and mobility management entity (MME).

Event monitoring is one of the exposure functions providing various user equipment (UE) monitoring. For example, in 3GPP technical specification (TS) 23.682, the following eight events are supported by the 3GPP network. The first event is loss of connectivity, which means the SCS/AS requests to be notified when the 3GPP network detects that the UE is no longer reachable for signalling or user plane communication. The second event is UE reachability, which means the SCS/AS requests to be notified when the UE becomes reachable for sending either short messaging service (SMS) or downlink data to the UE. The third event is location reporting, which means the SCS/AS requests to be notified of the current location or the last known location of the UE. The fourth event is change of international mobile subscriber identification number (IMSI)-international mobile equipment identity (IMEI) association, which means the SCS/AS requests to be notified when the association of an ME (IMEI(SV)) that uses a specific subscription (IMSI) is changed. The term "ME" refers to mobile equipment and the term "SV" refers to software version.

The fifth event is roaming status, which means the SCS/AS queries the UE's current roaming status and requests to get notified when the status changes. The sixth event is communication failure, which means the SCS/AS requests to be notified of communication failure events. The seventh event is availability after downlink data notification (DDN) failure, which means the SCS/AS requests to be notified when the UE has become available after a DDN failure. The eighth event is number of UEs present in a geographical area, which means the SCS/AS requests to know how many UEs are in the requested area. In order to reduce the signalling when a group of UEs is required to have the same type of monitoring event, UE grouping concept is introduced in 3GPP. The third party SCS/AS and 3GPP network are both configured with an external group ID which represents a list of UEs.

Among the above monitoring events, the monitoring event related to internet protocol (IP)-connectivity access network (CAN) session/bearer status (i.e. "communication failure") can be supported in the 3GPP network by either HSS/MME/serving GPRS support node (SGSN) or policy and charging rules function (PCRF). The term "GPRS" refers to general packet radio service. The communication failure event will be reported by the 3GPP network when a bearer/session is terminated (e.g. due to radio resource limitation or policy and charging enforcement function (PCEF) initiated termination). A radio access network (RAN)/non-access stratum (NAS)/trusted wide area network (TWAN)/untrusted wide area network (UWAN) release cause is also reported. SCEF may normalize the received release cause and send it to the third party SCS/AS.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for event monitoring.

According to a first aspect of the disclosure, there is provided a method implemented at a network exposure node. The method may comprise receiving, from a server, a first request for monitoring communication failure for at least one terminal device. The method may further comprise obtaining a connection identity (ID) for identifying a connection between the at least one terminal device and the server, based on the received first request. The method may further comprise sending, to a subscriber management node or a policy decision node, a second request for monitoring communication failure for the at least one terminal device. The second request may include the obtained connection ID.

In an embodiment of the disclosure, the first request may include an ID of the server and an ID of the at least one terminal device. Obtaining the connection ID may comprise determining the connection ID based on the ID of the server and the ID of the at least one terminal device.

In an embodiment of the disclosure, the server may be an SCS or an AS. The ID of the server may be an SCS/AS ID, the ID of the at least one terminal device may be an external ID or an external group ID, and the connection ID may be an access point name (APN). Each of the first and second requests may be a Monitoring Request message.

In an embodiment of the disclosure, the server may be an application function (AF). The ID of the server may be an AF ID, the ID of the at least one terminal device may be an external ID or an external group ID, and the connection ID may be a combination of a data network name (DNN) and single network slice selection assistance information (S-NSSAI).

In an embodiment of the disclosure, the connection ID may be an IP domain of a terminal device that is included in the first request. Obtaining the connection ID may comprise extracting the IP domain of the terminal device from the first request. Each of the first and second requests may be a Monitoring Request message.

According to a second aspect of the disclosure, there is provided a method implemented at a subscriber management node. The method may comprise receiving, from a network exposure node, a request for monitoring communication failure for at least one terminal device. The request may include a connection ID for identifying a connection between the at least one terminal device and a server subscribing to the monitoring. The method may further comprise sending, to a mobility management node or a session management node, an instruction for monitoring communication failure for the at least one terminal device. The instruction may include the connection ID or a second ID. The second ID may be associated with the connection ID and identify the connection between the at least one terminal device and the server.

In an embodiment of the disclosure, the connection ID may be an APN. The request may be a Monitoring Request message, and the instruction may be an Insert Subscriber Data Request message or an Update Location Answer message.

In an embodiment of the disclosure, the request may include an ID of the at least one terminal device. The second ID and the session management node may be determined by the subscriber management node based on the connection ID and the ID of the at least one terminal device.

In an embodiment of the disclosure, the connection ID may be a combination of a DNN and S-NSSAI. The connection may be a protocol data unit (PDU) session and the second ID may be a PDU session ID.

According to a third aspect of the disclosure, there is provided a method implemented at a mobility management node. The method may comprise receiving, from a subscriber management node, an instruction for monitoring communication failure for a terminal device. The instruction may include a connection ID for identifying a connection between the terminal device and a server subscribing to the monitoring. The method may further comprise performing a monitoring procedure for the connection identified by the connection ID such that a monitoring report associated with the connection ID is provided to a network exposure node.

In an embodiment of the disclosure, performing the monitoring procedure may comprise monitoring communication failure for the terminal device based on the connection ID. Performing the monitoring procedure may further comprise sending, to the network exposure node, the monitoring report indicating a result of the monitoring.

In an embodiment of the disclosure, the connection ID may be an APN. The instruction may be an Insert Subscriber Data Request message or an Update Location Answer message.

In an embodiment of the disclosure, the instruction may include an ID of the terminal device. Performing the monitoring procedure may comprise determining a second ID and a session management node based on the connection ID and the ID of the terminal device. Performing the monitoring procedure may further comprise sending, to the session management node, a request for monitoring communication failure for the terminal device. The request includes the second ID.

In an embodiment of the disclosure, the connection ID may be a combination of a DNN and S-NSSAI.

In an embodiment of the disclosure, the connection is a PDU session and the second ID is a PDU session ID.

According to a fourth aspect of the disclosure, there is provided a method implemented at a session management node. The method may comprise receiving, from a mobility management node or a subscriber management node, a request for monitoring communication failure for a terminal device. The request may include a second ID for identifying a connection between the terminal device and a server subscribing to the monitoring. The method may further comprise performing a monitoring procedure for the connection identified by the second ID such that a monitoring report associated with the second ID is provided to a network exposure node.

In an embodiment of the disclosure, performing the monitoring procedure may comprise monitoring communication failure for the terminal device based on the second ID. Performing the monitoring procedure may further comprise sending, to the network exposure node, the monitoring report indicating a result of the monitoring.

In an embodiment of the disclosure, the monitoring report is sent to the network exposure node directly or via the mobility management node.

In an embodiment of the disclosure, the monitoring report may include failure cause of the communication failure.

In an embodiment of the disclosure, the connection is a PDU session and the second ID is a PDU session ID.

According to a fifth aspect of the disclosure, there is provided a method implemented at a policy decision node. The method may comprise receiving, from a network exposure node, a request for monitoring communication failure for multiple terminal devices. The request may include a connection ID for identifying connections between the multiple terminal devices and a server subscribing to the monitoring. The method may further comprise identifying, for a terminal device from the multiple terminal devices, a corresponding policy enforcement node and the connection between the terminal device and the server, based on the connection ID. The method may further comprise performing a monitoring procedure for the identified connection via the corresponding policy enforcement node such that a monitoring report associated with the connection ID is provided to the network exposure node.

In an embodiment of the disclosure, performing the monitoring procedure may comprise initiating an IP-CAN session modification for the identified connection via the corresponding policy enforcement node. Performing the monitoring procedure may further comprise sending, to the network exposure node, the monitoring report indicating a result of the IP-CAN session modification.

In an embodiment of the disclosure, the connection ID may be an APN. The request may be a Monitoring Request message.

According to a sixth aspect of the disclosure, there is provided a network exposure node. The network exposure node may comprise at least one processor and at least one memory. The at least one memory may contain instructions executable by the at least one processor, whereby the network exposure node may be operative to receive, from a server, a first request for monitoring communication failure for at least one terminal device. The network exposure node may be further operative to obtain a connection ID for identifying a connection between the at least one terminal device and the server, based on the received first request. The network exposure node may be further operative to send, to a subscriber management node or a policy decision node, a second request for monitoring communication failure for the at least one terminal device. The second request may include the obtained connection ID.

In an embodiment of the disclosure, the network exposure node may be operative to perform the method according to the above first aspect.

According to a seventh aspect of the disclosure, there is provided a subscriber management node. The subscriber management node may comprise at least one processor and at least one memory. The at least one memory may contain instructions executable by the at least one processor, whereby the subscriber management node may be operative to receive, from a network exposure node, a request for monitoring communication failure for at least one terminal device. The request may include a connection ID for identifying a connection between the at least one terminal device and a server subscribing to the monitoring. The subscriber management node may be further operative to send, to a mobility management node or a session management node, an instruction for monitoring communication failure for the at least one terminal device. The instruction may include the connection ID or a second ID. The second ID may be associated with the connection ID and identify the connection between the at least one terminal device and the server.

In an embodiment of the disclosure, the subscriber management node may be operative to perform the method according to the above second aspect.

According to an eighth aspect of the disclosure, there is provided a mobility management node. The mobility management node may comprise at least one processor and at least one memory. The at least one memory may contain instructions executable by the at least one processor, whereby the mobility management node may be operative to receive, from a subscriber management node, an instruction for monitoring communication failure for a terminal device. The instruction may include a connection ID for identifying a connection between the terminal device and a server subscribing to the monitoring. The mobility management node may be further operative to perform a monitoring procedure for the connection identified by the connection ID such that a monitoring report associated with the connection ID is provided to a network exposure node.

In an embodiment of the disclosure, the mobility management node may be operative to perform the method according to the above third aspect.

According to a ninth aspect of the disclosure, there is provided a session management node. The session management node may comprise at least one processor and at least one memory. The at least one memory may contain instructions executable by the at least one processor, whereby the session management node may be operative to receive, from a mobility management node or a subscriber management node, a request for monitoring communication failure for a terminal device. The request may include a second ID for identifying a connection between the terminal device and a server subscribing to the monitoring. The session management node may be further operative to perform a monitoring procedure for the connection identified by the second ID such that a monitoring report associated with the second ID is provided to a network exposure node.

In an embodiment of the disclosure, the session management node may be operative to perform the method according to the above fourth aspect.

According to a tenth aspect of the disclosure, there is provided a policy decision node. The policy decision node may comprise at least one processor and at least one memory. The at least one memory may contain instructions executable by the at least one processor, whereby the policy decision node may be operative to receive, from a network exposure node, a request for monitoring communication failure for multiple terminal devices. The request may include a connection ID for identifying connections between the multiple terminal devices and a server subscribing to the monitoring. The policy decision node may be further operative to identify, for a terminal device from the multiple terminal devices, a corresponding policy enforcement node and the connection between the terminal device and the server, based on the connection ID. The policy decision node may be further operative to perform a monitoring procedure for the identified connection via the corresponding policy enforcement node such that a monitoring report associated with the connection ID is provided to the network exposure node.

In an embodiment of the disclosure, the policy decision node may be operative to perform the method according to the above fifth aspect.

According to an eleventh aspect of the disclosure, there is provided a computer program product. The computer program product may comprise instructions which when executed by at least one processor, cause the at least one processor to perform the method according to any of the above first to fifth aspects.

According to a twelfth aspect of the disclosure, there is provided a computer readable storage medium. The computer readable storage medium may comprise instructions which when executed by at least one processor, cause the at least one processor to perform the method according to any of the above first to fifth aspects.

According to a thirteenth aspect of the disclosure, there is provided a network exposure node. The network exposure node may comprise a reception module for receiving, from a server, a first request for monitoring communication failure for at least one terminal device. The network exposure node may further comprise an obtaining module for obtaining a connection ID for identifying a connection between the at least one terminal device and the server, based on the received first request. The network exposure node may further comprise a sending module for sending, to a subscriber management node or a policy decision node, a second request for monitoring communication failure for the at least one terminal device. The second request may include the obtained connection ID.

According to a fourteenth aspect of the disclosure, there is provided a subscriber management node. The subscriber management node may comprise a reception module for receiving, from a network exposure node, a request for monitoring communication failure for at least one terminal device. The request may include a connection ID for identifying a connection between the at least one terminal device and a server subscribing to the monitoring. The subscriber management node may further comprise a sending module for sending, to a mobility management node or a session management node, an instruction for monitoring communication failure for the at least one terminal device. The instruction may include the connection ID or a second ID. The second ID may be associated with the connection ID and identify the connection between the at least one terminal device and the server.

According to a fifteenth aspect of the disclosure, there is provided a mobility management node. The mobility management node may comprise a reception module for receiving, from a subscriber management node, an instruction for monitoring communication failure for a terminal device. The instruction may include a connection ID for identifying a connection between the terminal device and a server subscribing to the monitoring. The mobility management node may further comprise a performing module for performing a monitoring procedure for the connection identified by the connection ID such that a monitoring report associated with the connection ID is provided to a network exposure node.

According to a sixteenth aspect of the disclosure, there is provided a session management node. The session management node may comprise a reception module for receiving, from a mobility management node or a subscriber management node, a request for monitoring communication failure for a terminal device. The request may include a second ID for identifying a connection between the terminal device and a server subscribing to the monitoring. The session management node may further comprise a performing module for performing a monitoring procedure for the connection identified by the second ID such that a monitoring report associated with the second ID is provided to a network exposure node.

According to a seventeenth aspect of the disclosure, there is provided a policy decision node. The policy decision node may comprise a reception module for receiving, from a network exposure node, a request for monitoring communication failure for multiple terminal devices. The request may include a connection ID for identifying connections between the multiple terminal devices and a server subscribing to the monitoring. The policy decision node may further comprise an identification module for identifying, for a terminal device from the multiple terminal devices, a corresponding policy enforcement node and the connection between the terminal device and the server, based on the connection ID. The policy decision node may further comprise a performing module for performing a monitoring procedure for the identified connection via the corresponding policy enforcement node such that a monitoring report associated with the connection ID is provided to the network exposure node.

According to some embodiment(s) of the disclosure, accurate event monitoring of communication failure can be achieved for a server subscribing to the event monitoring.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

As mentioned above, the communication failure event will be reported by the 3GPP network when a bearer/session is terminated. However, such bearer/session termination may not be of interest at all to the third party SCS/AS. For example, a UE has two packet data network (PDN) connections, one to SCS/AS A and another to SCS/AS B. The SCS/AS A does not care the PDN connection (session/bearer) status for the SCS/AS B. However, currently, communication failure is reported for all UE PDN connections. The SCS/AS will take wrong decision upon receiving a failure notification of other non-related PDN connection(s). Besides, the monitoring via PCRF for a single UE only includes UE IP address. Such UE IP address may not be unique if IP version 4 (IPv4) address is widely deployed. Thus, there might be IP address overlapping among several PDN connections.

Currently, it is not specified how to accurately support the monitoring event of "communication failure" in the 3GPP network for the concerned IP-CAN session/bearer of the third party SCS/AS in the following cases: HSS event monitoring for an individual UE or a group of UEs, and PCRF event monitoring for an individual UE or a group of UEs.

The present disclosure proposes improved solutions for event monitoring. Hereinafter, the solutions will be described in detail with reference to FIGS. 1-17.

Figure 1:
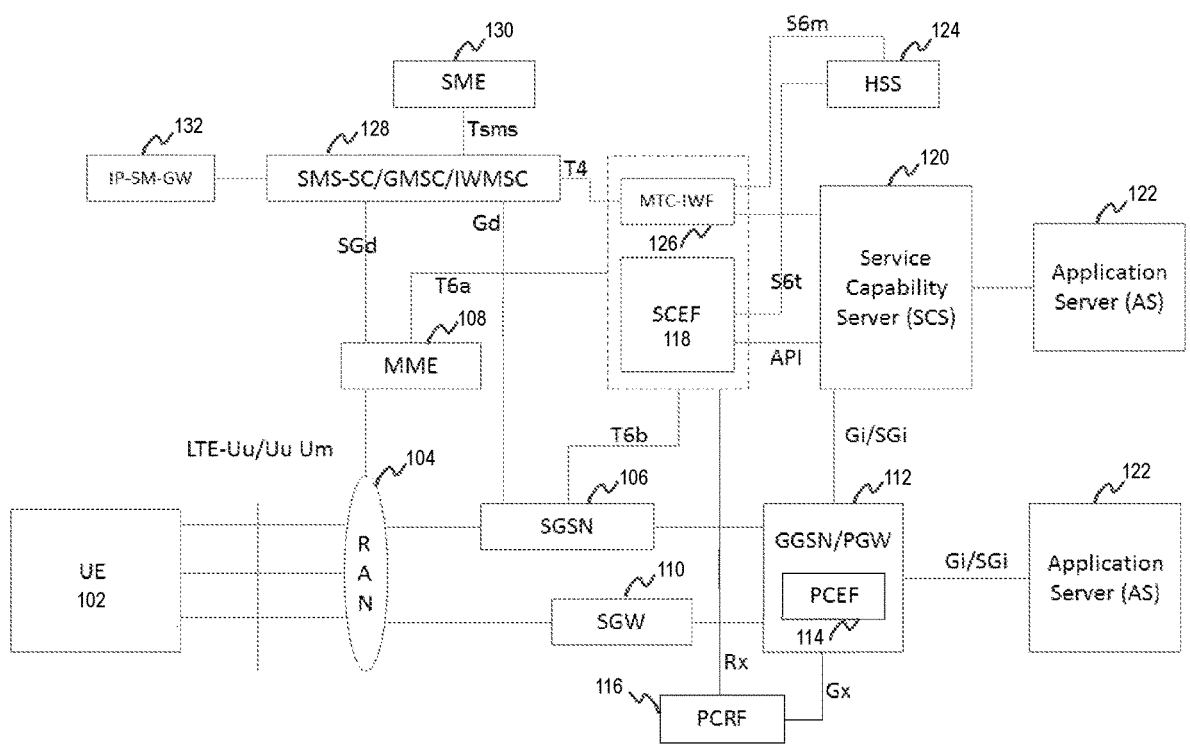
FIG. 1 is a diagram showing an exemplary communication system into which an embodiment of the disclosure is applicable.

FIG. 1 is a diagram showing an exemplary communication system into which an embodiment of the disclosure is applicable. As shown, the communication system comprises a user equipment (UE) 102, a radio access network (RAN) 104, a serving general packet radio service (GPRS) support node (SGSN) 106, a mobility management entity (MME) 108, a serving gateway (SGW) 110, a gateway GPRS support node (GGSN)/packet data network (PDN) gateway (PGW) 112, a policy and charging rules function (PCRF) 116, a service capability exposure function (SCEF) 118, a service capability server (SCS) 120, an application server (AS) 122 and a home subscriber server (HSS) 124. The GGSN/PGW 112 comprises a policy and charging enforcement function (PCEF) 114. Note that the amount of each entity mentioned above may be more than one.

The UE 102 can communicate through a radio access communication link with the RAN 104. The UE may also be referred to as, for example, terminal device, access terminal, mobile station, mobile unit, subscriber station, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The RAN 104 may include, for example, an universal mobile telecommunications system (UMTS) terrestrial RAN (UTRAN), a global system for mobile communication (GSM) enhanced data rate for GSM evolution (EDGE) RAN (GERAN), and/or an evolved universal terrestrial RAN (E-UTRAN). The UTRAN and the GERAN can each include radio network controller (RNC) nodes to control communications through radio base stations providing radio access communication links to UEs that are within their respective communication service cells. The E-UTRAN can include radio base station nodes (eNodeBs) that can provide the combined functionality of the RNC nodes and base stations of the UTRAN and the GERAN. The UE 102 may communicate with the GERAN via Um interface and communicate with the UTRAN and the E-UTRAN via Uu interface.

The SGSN 106 is a core network node in the UMTS and has a user-plane function and a control-plane function. The user-plane function of the SGSN 106 can transfer user data packets of the UE 102 between the RAN 104 and the GGSN/PGW 112. The control-plane function of the SGSN 106 can carry out mobility management of the UE 102, bearer management and the like. The MME 108 is a core network node in evolved packet system (EPS) and can carry out the mobility management of the UE 102, the bearer management, and the like. The SGW 110 is a packet transfer node in the core network of the EPS. The SGW 110 can transfers user data packets of the UE 102 between the RAN 104 and the GGSN/PGW 112.

The GGSN is a core network node in the UMTS. The PGW is a core network node in the EPS. The GGSN/PGW 112 means either the GGSN or the PGW or both. The GGSN/PGW 112 is a user-plane packet transfer node in the core network and can transfer user data packets of the UE 102. The GGSN/PGW 112 can serve as a gateway to an external PDN and provide the UE 102 with the connectivity to the external PDN.

The PCEF 114 included in the GGSN/PGW 112 can carry out quality of service (QoS) control and flow based bearer charging (FBC) per service data flow of the UE 102 in accordance with a policy and charging control (PCC) rule supplied from the PCRF 116. Correspondingly, the PCRF 116 is a control-plane entity in the core network of the EPS. The PCRF 116 can determine a PCC rule to be applied to a service data flow of the UE 102 and send the determined PCC rule to the GGSN/PGW 112 having the PCEF 114. The PCRF 116 may communicate with the PCEF 114 via Gx interface.

The SCEF 118 can securely expose the services and capabilities provided by 3GPP networks by providing access to the services and capabilities through homogenous network application programming interfaces (APIs) defined by open mobile alliance (OMA), GSM alliance (GSMA) and possibly other standardization bodies. The SCEF 118 may communicate with the PCRF 116 via Rx interface, with the MME 108 via T6a interface, and with the SGSN 106 via T6b interface.

The SCS 120 can make open service access (OSA) standard interfaces accessible by application and provide an abstraction of network protocol for application developers. As a gateway between applications and the network, the SCS 120 can accomplish mapping of OSA interfaces onto network protocols and vice versa. The SCS 120 may communicate with the GGSN/PGW 112 via Gi/SGi interface and with the SCEF 118 via T8 interface. The AS 122 may be a type of server designed to install, operate and host applications and associated services for users. The AS 122 may communicate with the GGSN/PGW 112 via Gi/SGi interface. The HSS 124 is a control-plane node in the core network of 3GPP public land mobile network (PLMN) and can manage subscriber information of the UE 102. The HSS 124 may communicate with the SCEF 118 via S6t interface.

As shown in FIG. 1, the communication system may further comprise a machine-type communication (MTC)-interworking function (IWF) 126, a short message service (SMS)-service center (SC)/gateway mobile switching center (GMSC)/interworking MSC (IWMSC) 128, a short message entity (SME) 130 and an Internet protocol (IP)-short message (SM)-gateway (GW) 132. It should be noted that the MME 108, the SGSN 106, the HSS 124, the PCEF 114, the PCRF 116 and the SCEF 118 are merely exemplary examples of the components in the communication system and may be replaced by components with similar functionalities. For example, in fifth generation (5G) core network (CN), the MME/SGSN may be replaced by an access and mobility management function (AMF), the HSS may be replaced by a unified data management (UDM), the PCEF may be replaced by a session management function (SMF), and the SCEF may be replaced by a network exposure function (NEF). In addition, event exposure data may be stored in a unified data repository (UDR) by the UDM.

Figure 2:
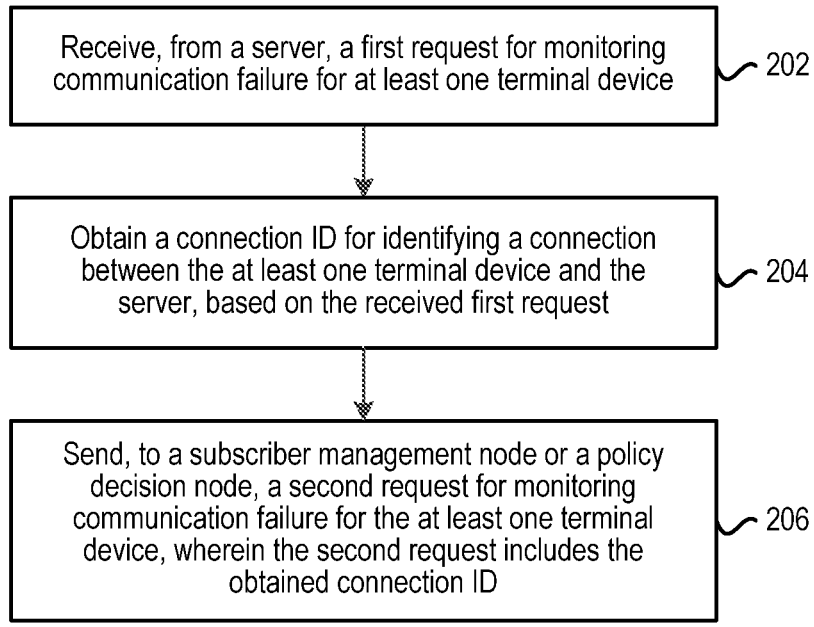
FIG. 2 is a flowchart illustrating a method implemented at a network exposure node according to an embodiment of the disclosure.

FIG. 2 is a flowchart illustrating a method implemented at a network exposure node according to an embodiment of the disclosure. For example, the network exposure node may take the form of an SCEF, an NEF, or any other entity having similar functionality. At block 202, the network exposure node receives, from a server, a first request for monitoring communication failure for at least one terminal device. For example, the server may be an SCS or AS or an application function (AF). Block 202 may be implemented as block 302 of FIG. 3 or block 402 of FIG. 4, which will be described later. At block 204, the network exposure node obtains a connection identity (ID) for identifying a connection between the at least one terminal device and the server, based on the received first request. The connection may refer to a PDN connection or a protocol data unit (PDU) session. Block 204 may be implemented as block 304 of FIG. 3 or block 404 of FIG. 4, which will be described later.

At block 206, the network exposure node sends, to a subscriber management node or a policy decision node, a second request for monitoring communication failure for the at least one terminal device. The second request includes the obtained connection ID. The subscriber management node may take the form of an HSS, a UDM, or any other entity having similar functionality. The policy decision node may take the form of a PCRF, or any other entity having similar functionality. Note that in case the monitoring for multiple terminal devices is requested, the second request is sent to multiple policy decision nodes. Since the connection ID is sent to the subscriber management node or the policy decision node, the monitoring via such node can be performed based on the connection ID so that accurate event monitoring of communication failure can be achieved for the server. Block 206 may be implemented as block 306 of FIG. 3 or block 406 of FIG. 4, which will be described later.

Figure 3:
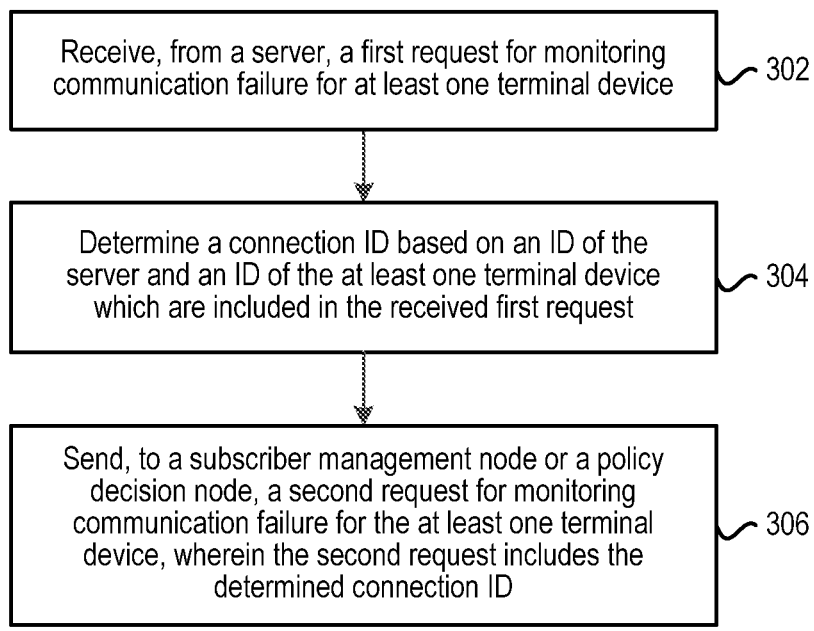
FIG. 3 is a flowchart illustrating a method implemented at a network exposure node according to another embodiment of the disclosure.

FIG. 3 is a flowchart illustrating a method implemented at a network exposure node according to another embodiment of the disclosure. As mentioned above, it can be used for explaining the method of FIG. 2. At block 302, the network exposure node receives, from a server, a first request for monitoring communication failure for at least one terminal device. The first request indicates "communication failure" as monitoring type and contains an ID of the server and an ID of the at least one terminal device. As an exemplary example, the first request may be a Monitoring Request message, the ID of the server may be an SCS/AS ID, and the ID of the at least one terminal device may be an external ID (in the case that monitoring for a single terminal device is requested) or an external group ID (in the case that monitoring for multiple terminal devices is requested). As another example, in the case of 5G, the ID of the server may be an AF ID and the ID of the at least one terminal device may be an external ID or an external group ID.

At block 304, the network exposure node determines the connection ID based on the ID of the server and the ID of the at least one terminal device which are contained in the received first request. The connection ID may be an access point name (APN) in LTE or a combination of a data network name (DNN) and single network slice selection assistance information (S-NSSAI) in 5G. As an exemplary example, there may be a predetermined correspondence between the connection ID and a combination of the IDs of the server and the at least one terminal device. The connection ID may be derived by a lookup operation on a table reflecting the correspondence. Note that depending on the actual application scenario, various other ways may be used instead to derive the connection ID. At block 306, the network exposure node sends, to a subscriber management node or a policy decision node, a second request for monitoring communication failure for the at least one terminal device. The second request includes the determined connection ID. The second request also indicates "communication failure" as monitoring type and contains the ID of the at least one terminal device from the first request. As an exemplary example, the second request may be a Monitoring Request message, and the ID of the at least one terminal device may be an external ID or an external group ID. Thus, current Monitoring Request message is enhanced by adding the connection ID. It is also possible that the network exposure node sends the ID of the server and the ID of the at least one terminal device to the subscriber management node or the policy decision node which then derives the connection ID based on the received IDs.

Figure 4:
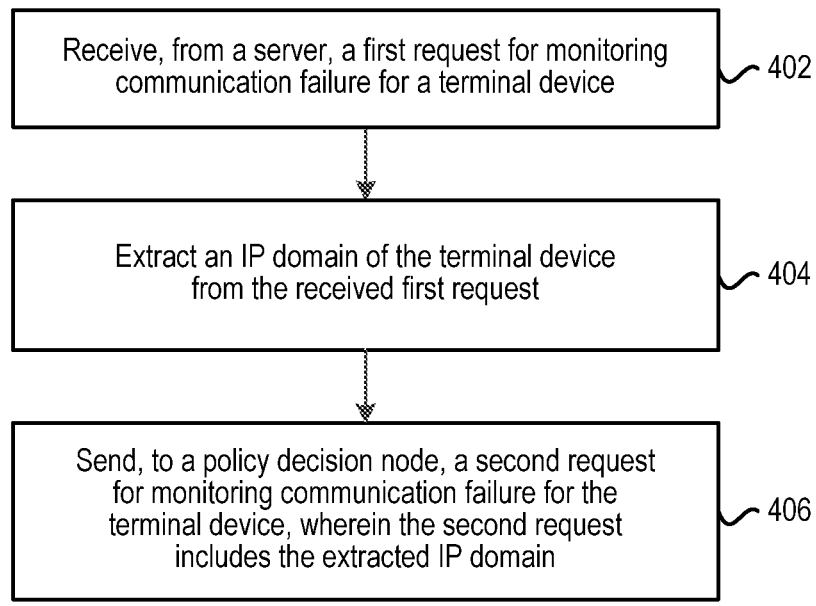
FIG. 4 is a flowchart illustrating a method implemented at a network exposure node according to another embodiment of the disclosure.

FIG. 4 is a flowchart illustrating a method implemented at a network exposure node according to another embodiment of the disclosure. As mentioned above, it can also be used for explaining the method of FIG. 2. At block 402, the network exposure node receives, from a server, a first request for monitoring communication failure for a terminal device. The first request indicates "communication failure" as monitoring type and contains an ID of the server, an IP address and an IP domain of the terminal device. For example, the details of IP domain may be obtained from 3GPP TS 29.214, which is incorporated herein by reference in its entirety. As an exemplary example, the first request may be a Monitoring Request message, and the ID of the server may be an SCS/AS ID. Thus, current Monitoring Request message is enhanced by adding the IP domain of the terminal device.

At block 404, the network exposure node extracts the IP domain of the terminal device from the received first request. That is, the connection ID in this embodiment is the IP domain of the terminal device. At block 406, the network exposure node sends, to a policy decision node, a second request for monitoring communication failure for the terminal device. The second request includes the extracted IP domain of the terminal device. Since the IP domain of the terminal device is sent to the policy decision node, the monitoring via such node can be performed based on the combination of the IP address and the IP domain of the terminal device so that IP address overlapping issue can be avoided.

Figure 5:
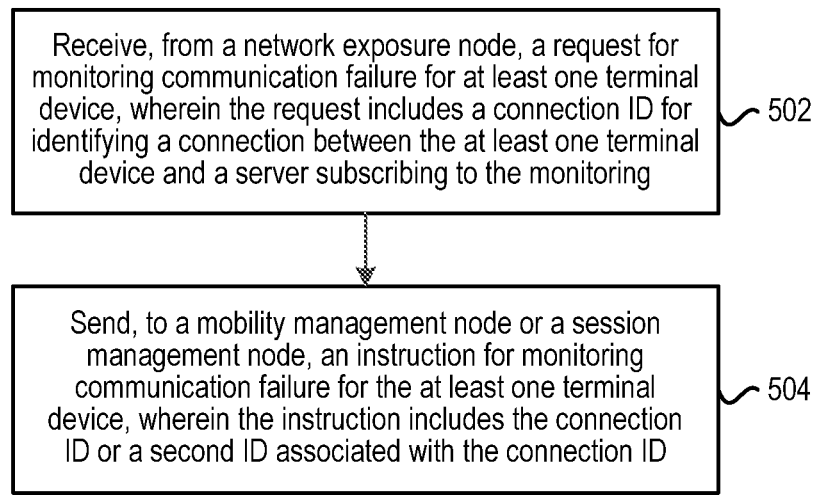
FIG. 5 is a flowchart illustrating a method implemented at a subscriber management node according to an embodiment of the disclosure.

FIG. 5 is a flowchart illustrating a method implemented at a subscriber management node according to an embodiment of the disclosure. For example, the subscriber management node may take the form of an HSS, a UDM, or any other entity having similar functionality. At block 502, the subscriber management node receives, from a network exposure node, a request for monitoring communication failure for at least one terminal device. The request includes a connection ID for identifying a connection between the at least one terminal device and a server subscribing to the monitoring. Block 502 corresponds to block 206 of FIG. 2 or block 306 of FIG. 3 and its details are omitted here.

At block 504, the subscriber management node sends, to a mobility management node or a session management node, an instruction for monitoring communication failure for the at least one terminal device. The instruction includes the connection ID or a second ID. The second ID is associated with the connection ID and identifies the connection between the at least one terminal device and the server. The mobility management node may take the form of an MME, an AMF, or any other entity having similar functionality. The session management node may be a session management function (SMF) or any other entity having similar functionality. The second ID may be a PDU session ID. In 5G system, a PDU session has a unique PDU session ID for the terminal device. The instruction may indicate "communication failure" as monitoring type. As an exemplar example, in the case of LTE, the instruction may be an Insert Subscriber Data Request message or an Update Location Answer message. Thus, current Insert Subscriber Data Request message or Update Location Answer message is enhanced by adding the connection ID. In the case of Update Location Answer message, this message is sent in response to an Update Location Request message indicating that the terminal device has moved to the serving area of another mobility management node.

In the case of 5G, as an option, the instruction including the connection ID (a combination of a DNN and S-NSSAI) may be sent to the mobility management node (an AMF). As another option, the subscriber management node (a UDM) may determine the second ID (a PDU session ID) and the session management node (an SMF) based on the connection ID and the ID of the at least one terminal device. For example, when the PDU session has been established for the at least one terminal device, the related information of the PDU session may be registered by the SMF to the UDM and maintained by the UDM. In this way, the PDU session ID and the SMF may be determined from the maintained information. Then, the instruction including the second ID (the PDU session ID) may be sent to the session management node (the SMF). Note that in case the monitoring for multiple terminal devices is requested, the instruction may be sent to multiple mobility management nodes or multiple session management nodes.

Figure 6:
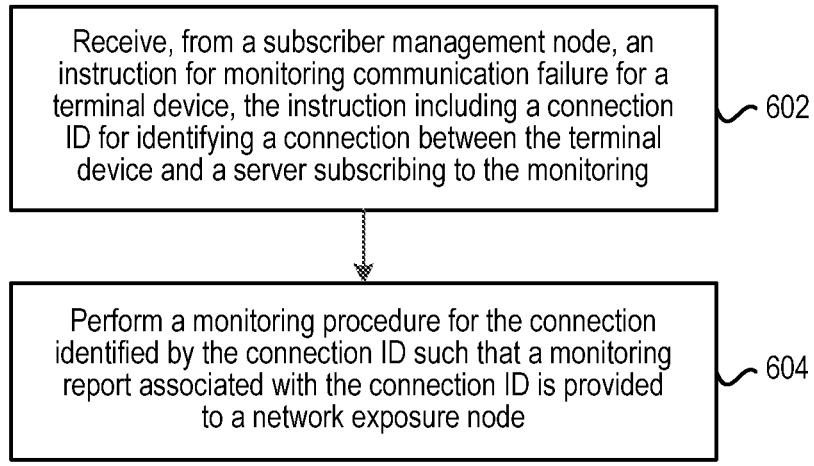
FIG. 6 is a flowchart illustrating a method implemented at a mobility management node according to an embodiment of the disclosure.

FIG. 6 is a flowchart illustrating a method implemented at a mobility management node according to an embodiment of the disclosure. For example, the mobility management node may take the form of an MME, an AMF, or any other entity having similar functionality. At block 602, the mobility management node receives, from a subscriber management node, an instruction for monitoring communication failure for a terminal device. The instruction includes a connection ID for identifying a connection between the terminal device and a server subscribing to the monitoring. Block 602 corresponds to block 504 and its details are omitted here. At block 604, a monitoring procedure is performed for the connection identified by the connection ID such that a monitoring report associated with the connection ID is provided to a network exposure node.

Figure 7:
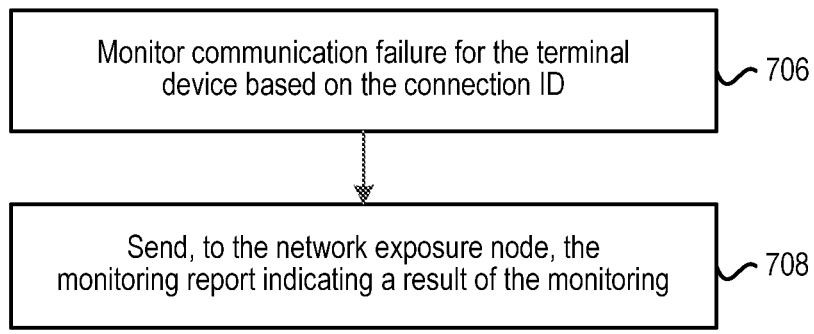
FIG. 7 is a flowchart for explaining the method of FIG. 6.

For example, block 604 may be implemented as blocks 706-708 of FIG. 7 in the LTE case. At block 706, the mobility management node monitors communication failure for the terminal device based on the connection ID. For example, the connection ID may be used as an event filter such that only the communication failure event(s) associated with both the ID of the terminal device and the connection ID are selected. At block 708, the mobility management node sends, to the network exposure node, the monitoring report indicating a result of the monitoring. For example, if the selected communication failure event(s) are available when sending the initial response to the instruction, the selected communication failure event(s) may be reported to the network exposure node via the subscriber management node. For the subsequent responses to the instruction, the selected communication failure event(s) may be reported directly to the network exposure node. This can eliminate the possibility for the server (e.g. SCS/AS) to receive communication failure notifications that are of no interest to the server and base on that to take wrong action. Thereby, the signaling of event configuration and reporting can be decreased.

Figure 8:
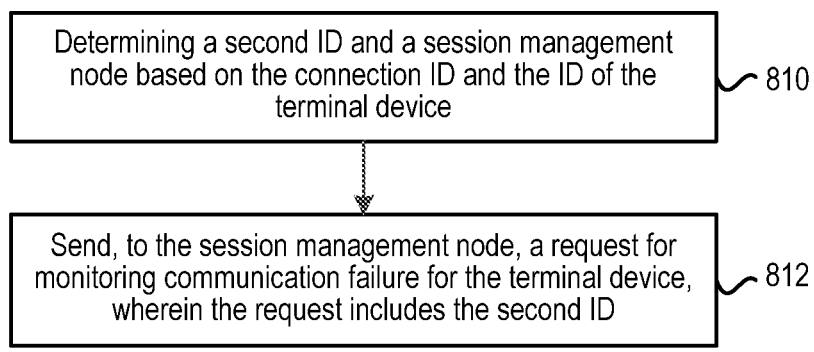
FIG. 8 is a flowchart for explaining the method of FIG. 6.

As another example, block 604 may be implemented as blocks 810-812 of FIG. 8 in the 5G case. At block 810, the mobility management node determines a second ID and a session management node based on the connection ID and the ID of the terminal device. For example, for the terminal device, the mobility management node (an AMF) may maintain the association among the second ID (a PDU session ID), the session management node (an SMF) and the connection ID (a combination of a DNN and S-NSSAI). The determination at block 810 may be performed according to this maintained association. At block 812, the mobility management node sends, to the session management node, a request for monitoring communication failure for the terminal device. The request includes the second ID.

Figure 9:
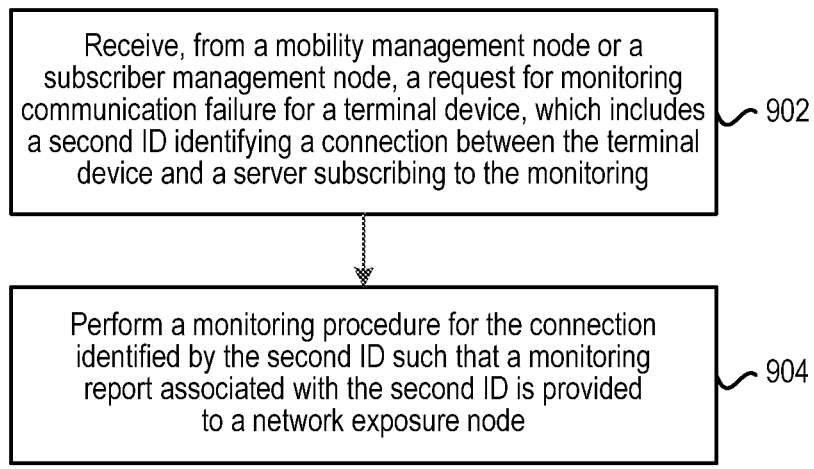
FIG. 9 is a flowchart illustrating a method implemented at a session management node according to an embodiment of the disclosure.
Figure 10:
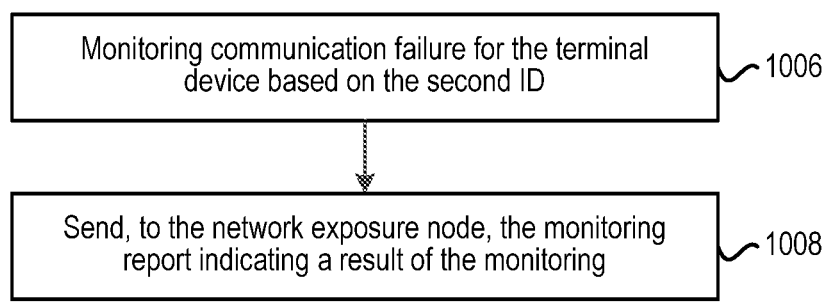
FIG. 10 is a flowchart for explaining the method of FIG. 9.

FIG. 9 is a flowchart illustrating a method implemented at a session management node according to an embodiment of the disclosure. For example, the session management node may be an SMF or any other entity having similar functionality. At block 902, the session management node receives, from a mobility management node or a subscriber management node, a request for monitoring communication failure for a terminal device. The request includes a second ID for identifying a connection between the terminal device and a server subscribing to the monitoring. For example, the connection may be a PDU session and the second ID may be a PDU session ID. The reception of the request from the mobility management node corresponds to block 812. As described above with respect to block 504, the request may also be received from a subscriber management node.

At block 904, the session management node performs a monitoring procedure for the connection identified by the second ID such that a monitoring report associated with the second ID is provided to a network exposure node. The monitoring report may include failure cause of the communication failure. For example, block 904 may be implemented as blocks 1006-1008 of FIG. 10. At block 1006, the session management node monitors communication failure for the terminal device based on the second ID. For example, the second ID may be used as an event filter such that only the communication failure event(s) associated with both the ID of the terminal device and the second ID are selected. At block 1008, the session management node sends, to the network exposure node, the monitoring report indicating a result of the monitoring. For example, the monitoring report may be sent to the network exposure node directly or via the mobility management node.

Figure 11:
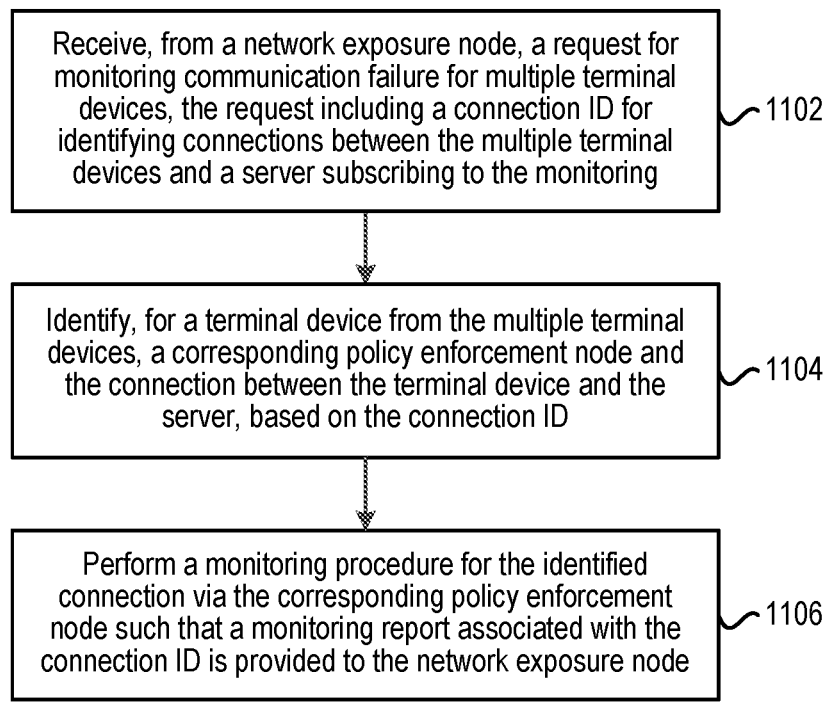
FIG. 11 is a flowchart illustrating a method implemented at a policy decision node according to an embodiment of the disclosure.
Figure 12:
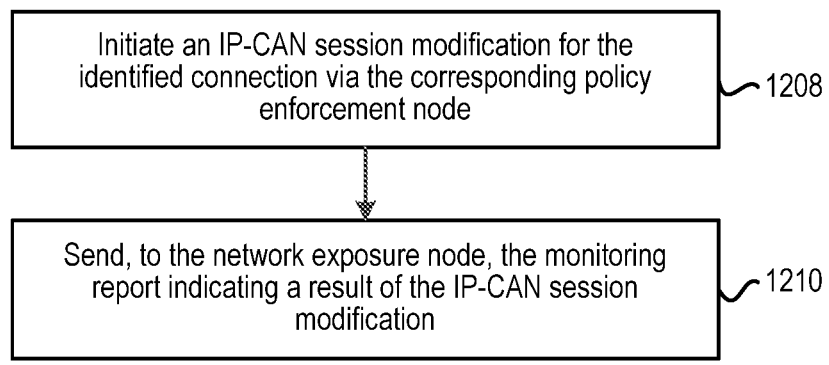
FIG. 12 is a flowchart for explaining the method of FIG. 11.

FIG. 11 is a flowchart illustrating a method implemented at a policy decision node according to an embodiment of the disclosure. For example, the policy decision node may take the form of a PCRF, or any other entity having similar functionality. At block 1102, the policy decision node receives, from a network exposure node, a request for monitoring communication failure for multiple terminal devices. The request includes a connection ID for identifying connections between the multiple terminal devices and a server subscribing to the monitoring. Block 1102 corresponds to block 206 of FIG. 2 or block 306 of FIG. 3 and its details are omitted here. At block 1104, the policy decision node identifies, for a terminal device from the multiple terminal devices, a corresponding policy enforcement node and the connection between the terminal device and the server, based on the connection ID. The policy enforcement node may take the form of a PCEF, or any other entity having similar functionality. For example, the policy enforcement node maintaining information about a session (e.g. IP-CAN session) corresponding to both the ID of the terminal device and the connection ID may be identified as the corresponding policy enforcement node. The session may be identified as the connection between the terminal device and the server.

At block 1106, the policy decision node performs a monitoring procedure for the identified connection via the corresponding policy enforcement node such that a monitoring report associated with the connection ID is provided to the network exposure node. Since the monitoring is performed based on the connection ID, accurate event monitoring of communication failure can be achieved for the server. For example, block 1106 may be implemented as blocks 1208-1210 of FIG. 12. At block 1208, the policy decision node initiates an IP-CAN session modification for the identified connection via the corresponding policy enforcement node. At block 1210, the policy decision node sends, to the network exposure node, the monitoring report indicating a result of the IP-CAN session modification. This can eliminate the possibility for the server (e.g. SCS/AS) to receive communication failure notifications that are of no interest to the server and base on that to take wrong action. Thereby, the signaling of event configuration and reporting can be decreased.

Figure 13:
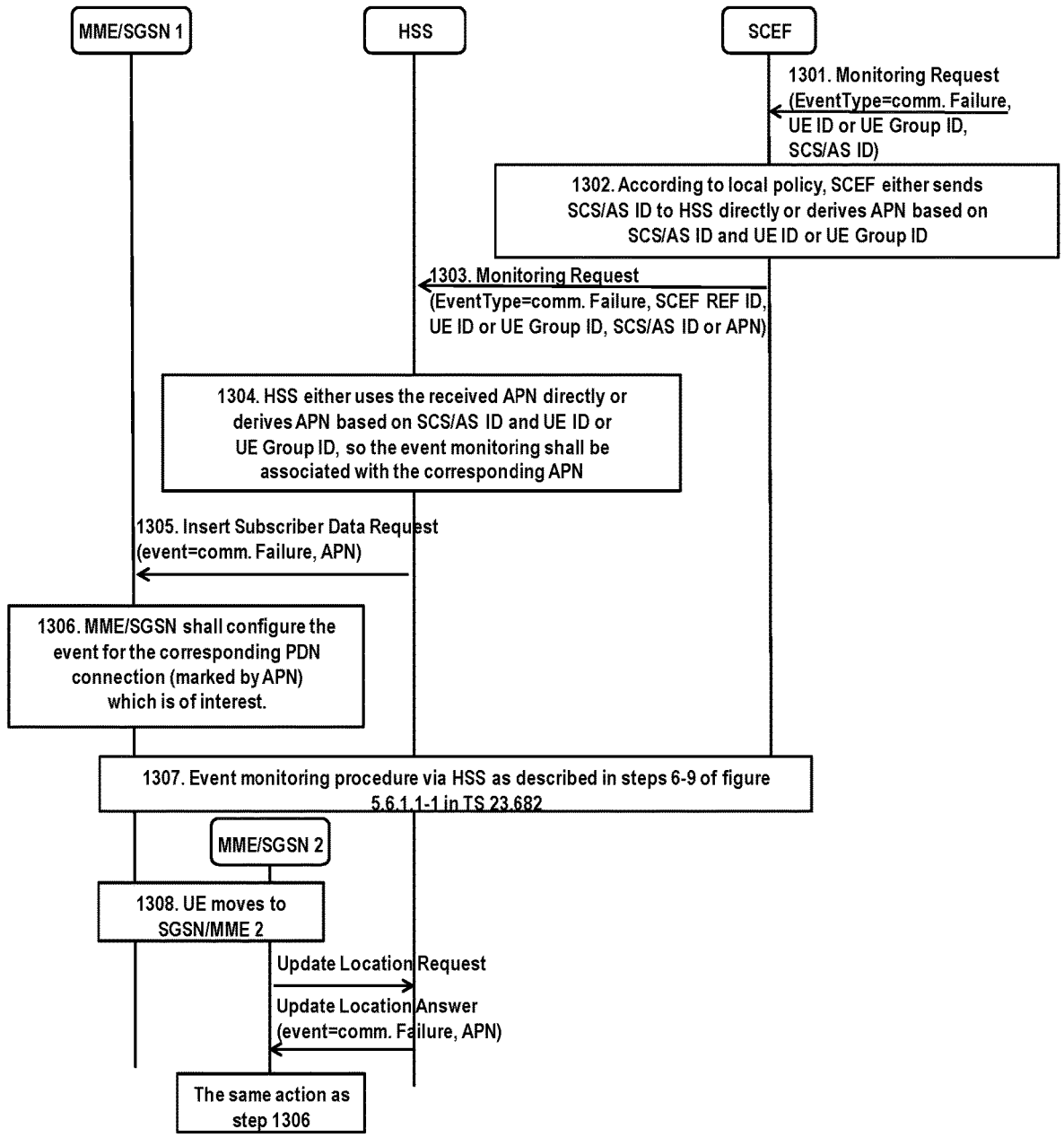
FIG. 13 is a flowchart illustrating an exemplary process according to an embodiment of the disclosure.

FIG. 13 is a flowchart illustrating an exemplary process according to an embodiment of the disclosure. As shown, in this exemplary process, the server is an SCS/AS, the network exposure node is an SCEF, the subscriber management node is an HSS, and the mobility management node is an MME/SGSN. This exemplary process is used for event monitoring via HSS. At block 1301, the SCEF receives, from the SCS/AS, a Monitoring Request including an SCS/AS ID, an external UE ID or UE group ID, with monitoring type set to "Communication Failure". At block 1302, according to local policy, the SCEF either sends the received SCS/AS ID to the HSS transparently or derives an APN based on the SCS/AS ID and external UE ID or UE group ID. At block 1303, the SCEF sends, to the HSS, a Monitoring Request including the SCS/AS ID or APN. Thus, the Monitoring Request message is enhanced by adding the SCS/AS ID or APN.

At block 1304, the HSS either uses the received APN or derives the APN according to the SCS/AS ID and external UE ID or UE group ID. The HSS may store the received information, thereby setting the event associated with the APN. At block 1305, the HSS sends the APN together with the event in an Insert Subscriber Data Request to the MME/SGSN 1. Thus, the Insert Subscriber Data Request message is enhanced by adding the APN. At block 1306, the MME/SGSN 1 marks (or associates) the PDN connection that will report the corresponding event later, as indicated by the received APN. At block 1307, the event monitoring procedure via HSS as described in steps 6-9 of FIG. 5.6.1.1-1 in 3GPP TS 23.682 is performed. Suppose at block 1308, the UE moves to the serving area of MME/SGSN 2. In this case of UE mobility, the HSS sends the APN together with the event in an Update Location Answer to the new MME/SGSN 2, in response to an Update Location Request from the MME/SGSN2. Then, block 1306 is performed.

Figure 14:
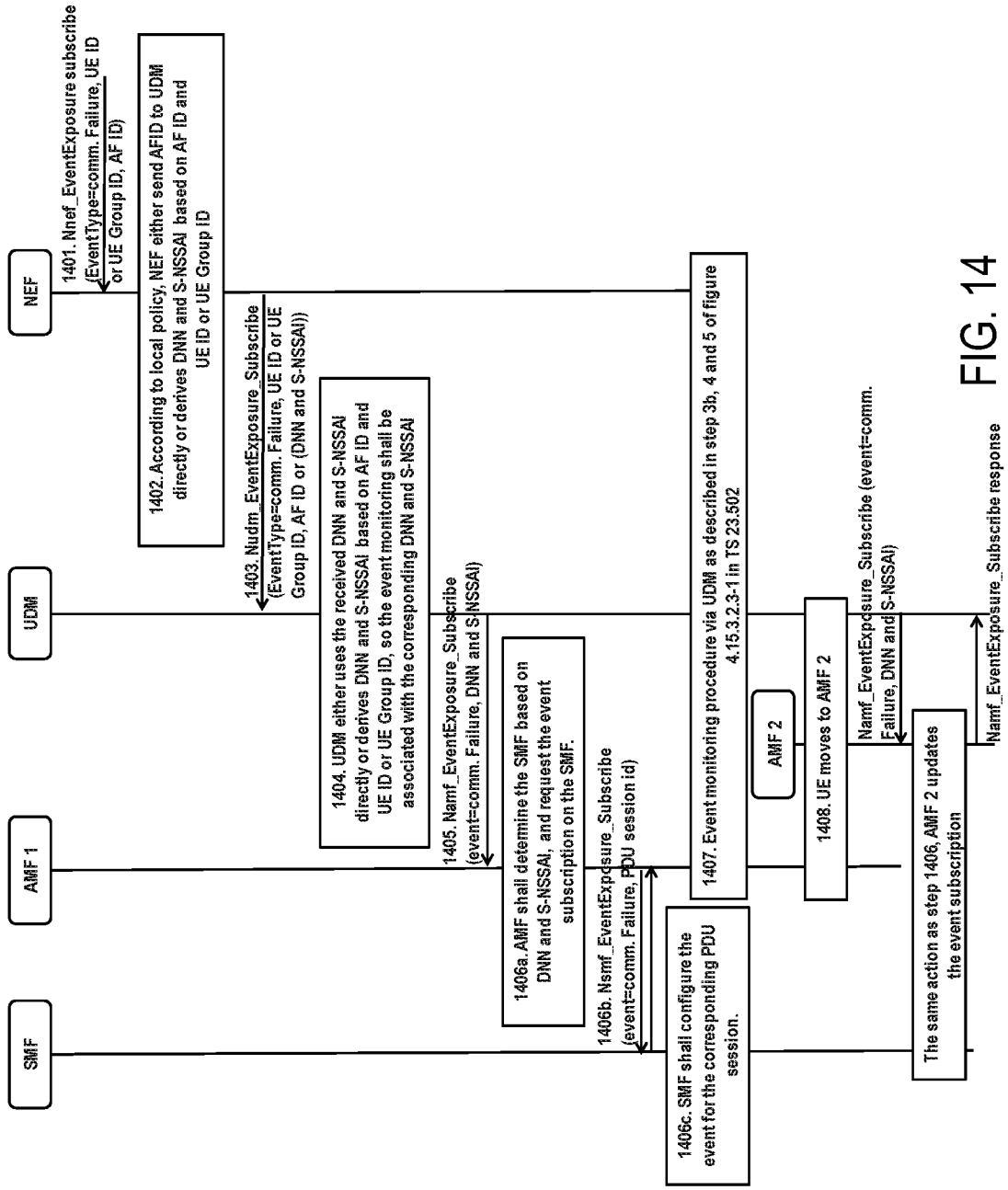
FIG. 14 is a flowchart illustrating another exemplary process according to an embodiment of the disclosure.

FIG. 14 is a flowchart illustrating another exemplary process according to an embodiment of the disclosure. As shown, in this exemplary process, the server is an AF, the network exposure node is an NEF, the subscriber management node is a UDM, the mobility management node is an AMF and the session management node is an SMF. This exemplary process is used for event monitoring via UDM. At block 1401, the NEF receives, from the AF, a service subscription, Nnef_EventExposure_subscribe, including an AF ID, an external UE ID or UE group ID, with event type set to "Communication Failure". At block 1402, according to local policy, the NEF either sends the received AF ID to the UDM directly or derives (DNN and S-NSSAI) based on the AF ID and external UE ID or UE group ID. At block 1403, the SCEF sends (DNN and S-NSSAI) to the UDM in Nudm_EventExposure service.

At block 1404, the UDM either uses the received (DNN and S-NSSAI) or derives the (DNN and S-NSSAI) according to the AF ID and external UE ID or UE group ID. The UDM stores the (DNN and S-NSSAI) as part of the event exposure data in a UDR by Nudr DM service. At block 1405, the UDM sends the (DNN and S-NSSAI) to the AMF 1 in Namf_EventExposure service. At block 1406a, the AMF 1 determines the SMF and the PDU session ID, based on the (DNN and S-NSSAI). At block 1406b, the AMF 1 sends to the SMF a service subscription, Nsmf_EventExposure_Subscribe, including PDU session ID, with event type set to "Communication Failure". At block 1406c, the SMF configures the event for the corresponding PDU session. At block 1407, the event monitoring procedure via UDM as described in steps 3b, 4 and 5 of FIG. 4.15.3.2.3-1 in TS 23.502 is performed. Suppose at block 1408, the UE moves to the serving area of AMF 2. In this case of UE mobility, the UDM sends the (DNN and S-NSSAI) together with the event in a service subscription, Namf_EventExposure_Subscribe, in response to a registration from the AMF 2. Then, block 1406 is performed. In case the AMF re-selects another SMF (e.g. due to load re-balance) to serve the PDU session identified by the PDU session ID which is associated with DNN and S-NSSAI for the UE, block 1406b and 1406c are performed.

Figure 15:
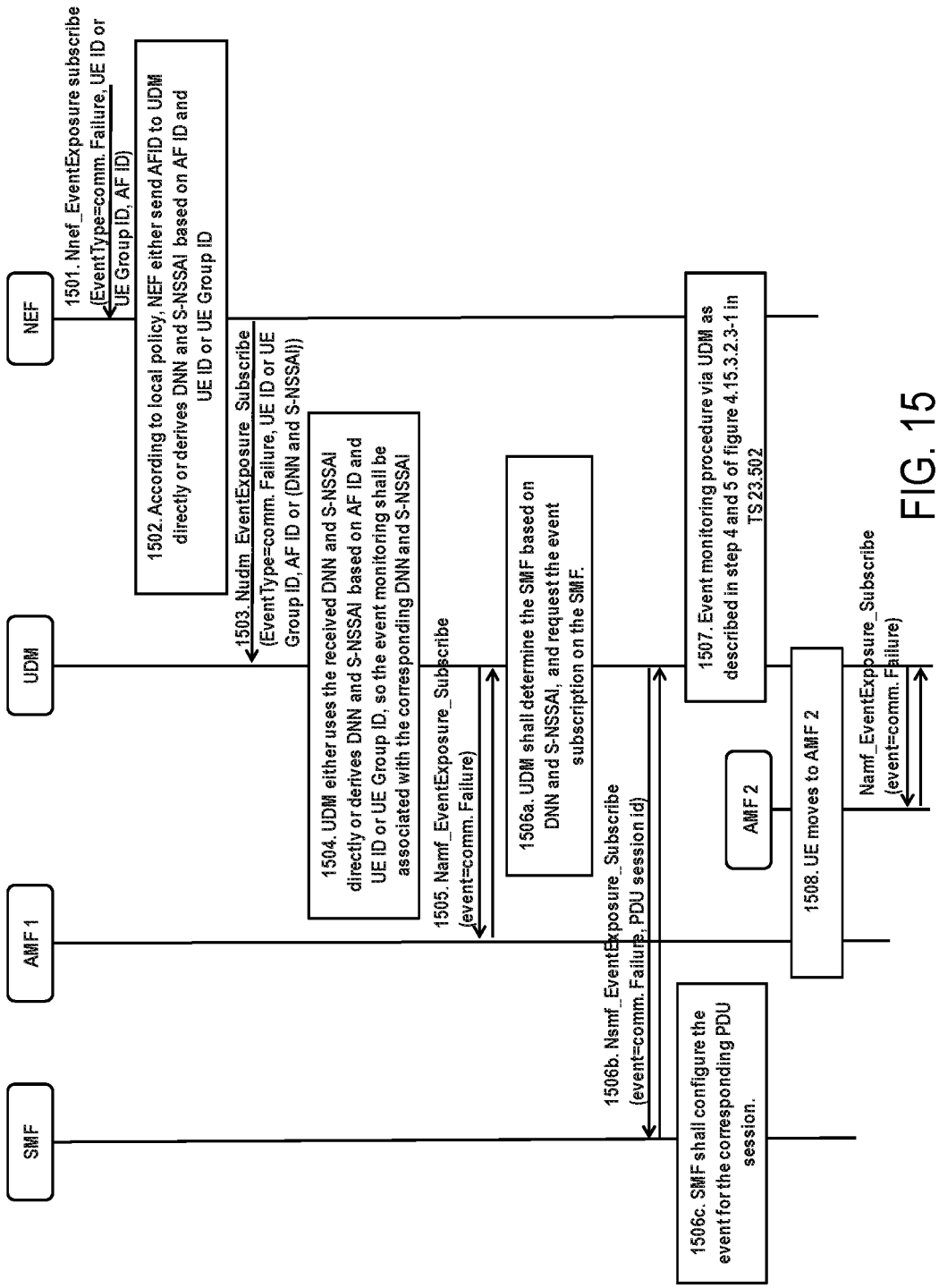
FIG. 15 is a flowchart illustrating another exemplary process according to an embodiment of the disclosure.

FIG. 15 is a flowchart illustrating another exemplary process according to an embodiment of the disclosure. This process employs the "configuration on SMF via UDM", while the process of FIG. 14 employs the "configuration on SMF via AMF". The main differences between the two processes lie in that: 1) the UDM determines the SMF instead of the AMF, so there is no impact to the AMF service at block 1505; 2) the event subscription update on the SMF is not needed after the AMF change.

Blocks 1501-1504 are the same as blocks 1401-1404 of FIG. 14 and their details are omitted here. At block 1505, the UDM sends a subscription, Namf_EventExposure_Subscribe, to the AMF 1. At block 1506a, the UDM determines the SMF and the PDU session ID, based on the (DNN and S-NSSAI). At block 1506b, the UDM sends to the SMF a service subscription, Nsmf_EventExposure_Subscribe, including PDU session ID, with event type set to "Communication Failure". At block 1506c, the SMF configures the event for the corresponding PDU session. At block 1507, the event monitoring procedure via UDM as described in steps 4 and 5 of FIG. 4.15.3.2.3-1 in TS 23.502 is performed. Suppose at block 1508, the UE moves to the serving area of AMF 2. In this case of UE mobility, the UDM sends, to the AMF 2, a service subscription, Namf_EventExposure_Subscribe, in response to a registration from the AMF 2. In case the AMF re-selects another SMF (e.g. due to load re-balance) to serve the PDU session identified by the PDU session ID which is associated with DNN and S-NSSAI for the UE, block 1506b and 1506c are performed after registration of the re-selected SMF in the UDM.

Figure 16:
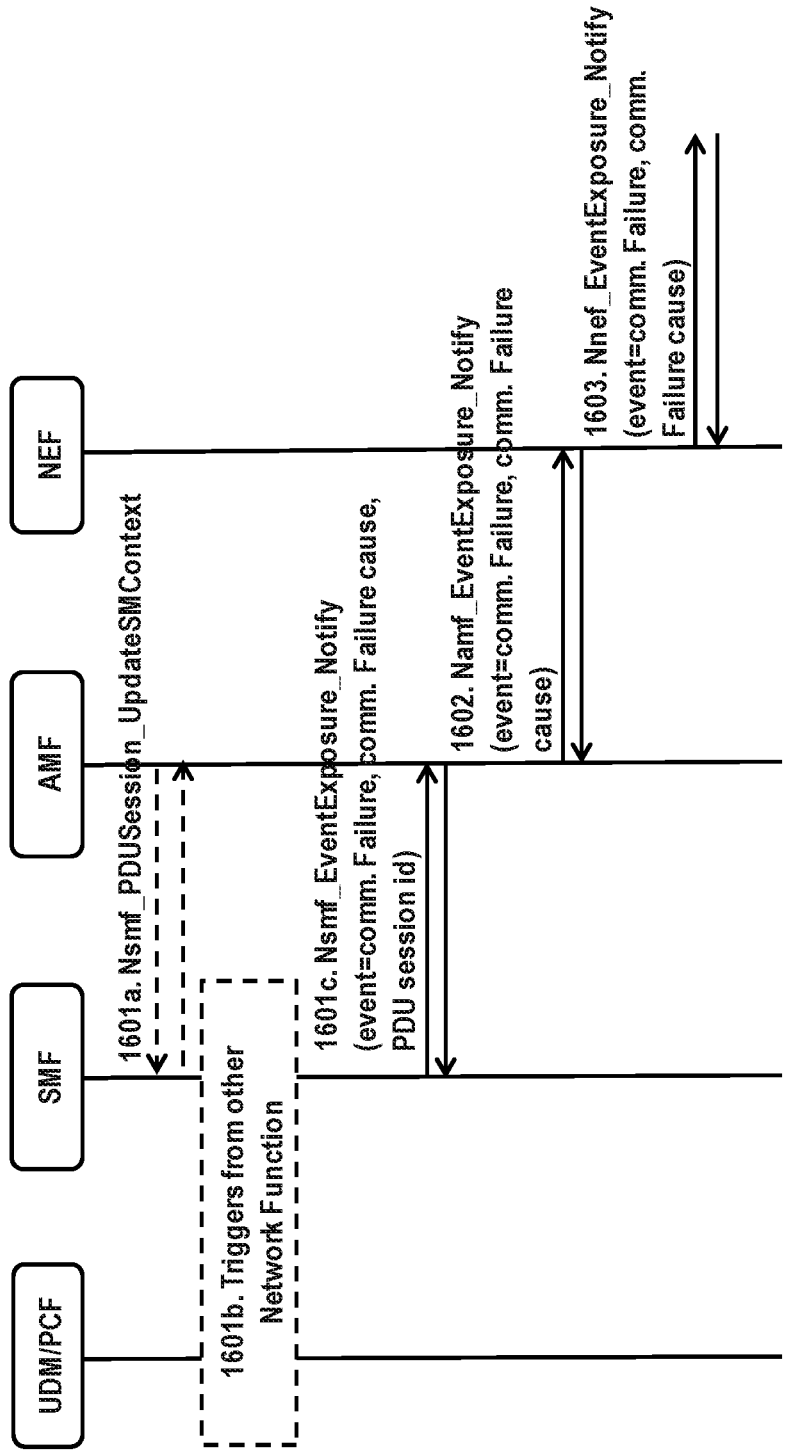
FIG. 16 is a flowchart illustrating event reporting for communication failure in 5G.

FIG. 16 is a flowchart illustrating event reporting for communication failure in 5G. Block 1601a is optional. At this block, the AMF requests the SMF to process N1/N2 Session Management information which includes the failure information. Block 1601b is optional. At this block, other NF (typically the UDM or PCF) informs the SMF a failure (e.g. Nudm_UECM_DeregistrationNotification or Npcf_SMPolicyControl_UpdateNotify) for the PDU session which is under event monitoring. The SMF may also initiate the event report by itself at block 1601c based on internal triggers. At block 1601c, 1602 and 1603, the corresponding event report including the failure cause for the PDU session under monitoring is sent.

Note that in block 1061calthough the AMF is the receiver for the Nsmf_EventExposure_Notify, it is also possible that the AMF, at Nsmf_EventExposure_Subscribe, sets the NEF as the receiver for the Nsmf_EventExposure_Notify. That is, block 1601c may be sent to the NEF directly so as to skip block 1602.

Figure 17:
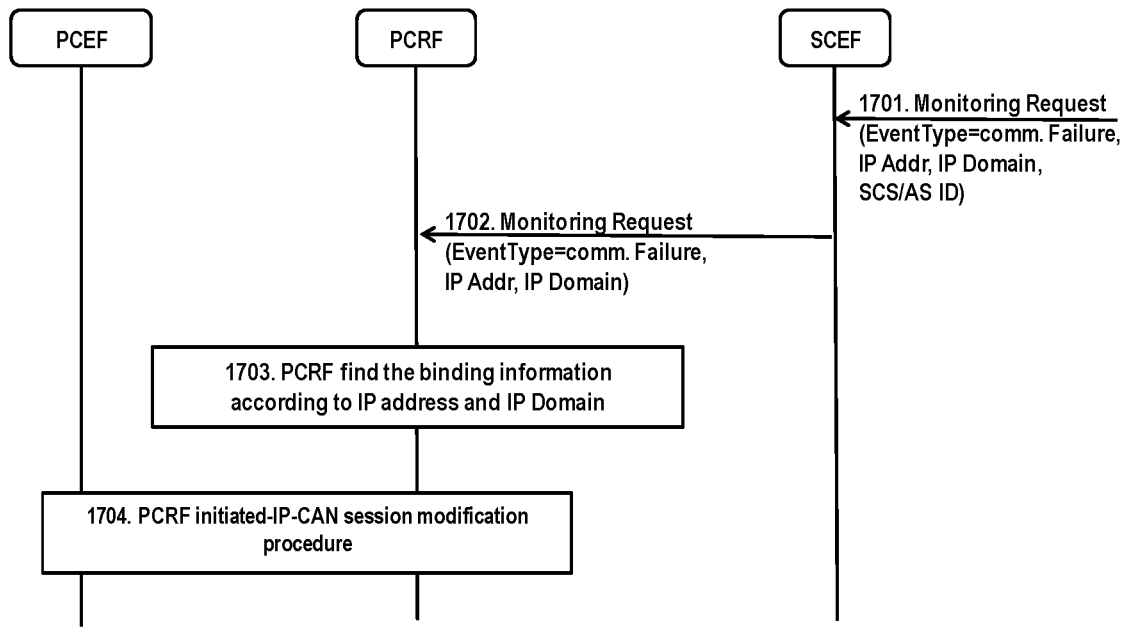
FIG. 17 is a flowchart illustrating another exemplary process according to an embodiment of the disclosure.

FIG. 17 is a flowchart illustrating another exemplary process according to an embodiment of the disclosure. As shown, in this exemplary process, the server is an SCS/AS, the network exposure node is an SCEF, the policy decision node is a PCRF, and the policy enforcement node is a PCEF. This exemplary process can be used to solve the IP address overlapping issue for a single UE case of monitoring via PCRF. At block 1701, the SCEF receives, from the SCS/AS, a Monitoring Request including IP address and IP domain with monitoring type set to "Communication Failure". The IP domain is used to identify the correct PDN connection. Thus, the Monitoring Request message is enhanced by adding the IP domain. At block 1702, the SCEF (acting as an application function (AF)) sends, to identified PCRF, a Monitoring Request including the IP domain. At block 1703, the PCRF finds the session binding information based on the IP address and IP domain. At block 1704, the PCRF initiated IP-CAN session modification procedure is executed.

Figure 18:
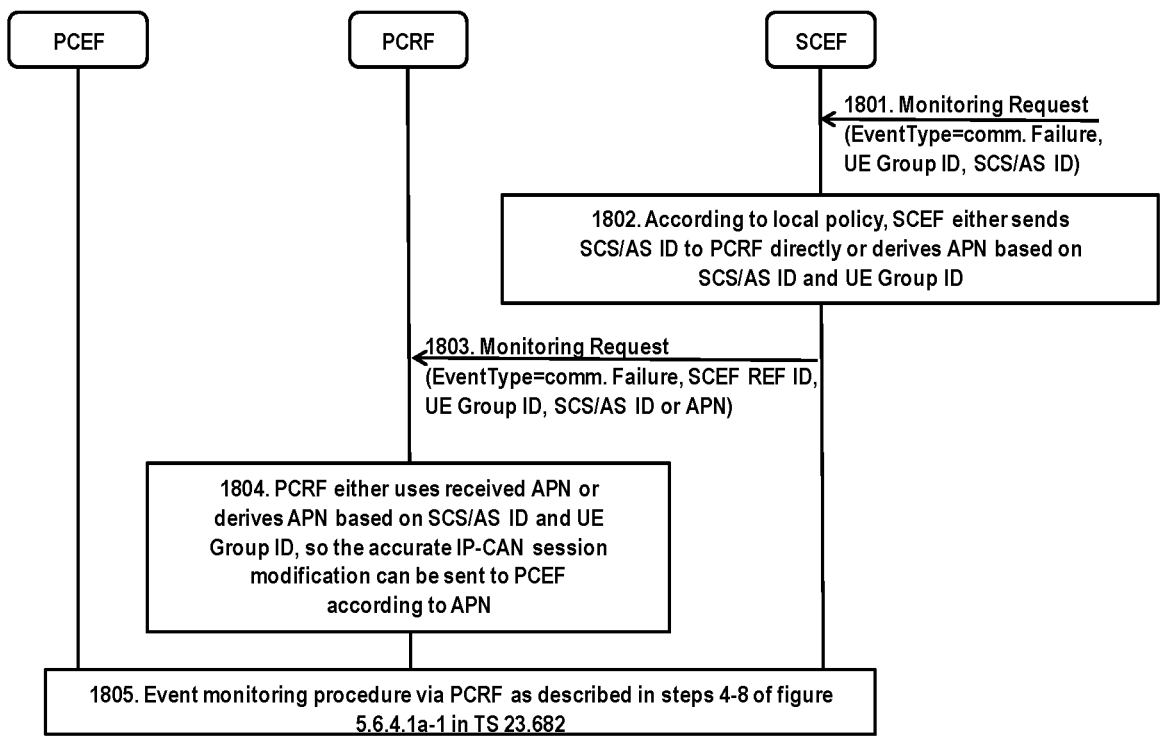
FIG. 18 is a flowchart illustrating another exemplary process according to an embodiment of the disclosure.

FIG. 18 is a flowchart illustrating another exemplary process according to an embodiment of the disclosure. As shown, in this exemplary process, the server is an SCS/AS, the network exposure node is an SCEF, the policy decision node is a PCRF, and the policy enforcement node is a PCEF. This exemplary process is used for the monitoring via PCRF for a group of UEs. Similar to FIG. 10, the APN information is used to find the correct PDN connection. At block 1801, the SCEF receives, from the SCS/AS, a Monitoring Request including an external group ID with monitoring type set to "Communication Failure". At block 1802, according to local policy, the SCEF either sends the received SCS/AS ID to the PCRF transparently or derives an APN based on the SCS/AS ID and external UE group ID. At block 1803, the SCEF sends, to all PCRFs in the same PLMN, monitoring requests each including the SCS/AS ID or APN. Thus, the Monitoring Request message is enhanced by adding the SCS/AS ID or APN.

At block 1804, for each PCRF, it either uses the received APN or derives the APN according to the SCS/AS ID and external UE group ID. Based on the APN, the PCRF finds the Gx session associated with the UE. Note that if there is no such Gx session, the PCRF does not need to trigger any IP-CAN session modification procedure. At block 1805, the event monitoring procedure via PCRF as described in steps 4-8 of FIG. 5.6.4.1a-1 in 3GPP TS 23.682 is performed. It should be noted that two blocks shown in succession in the figures may, in fact, be executed substantially concurrently, or the blocks may sometimes be executed in the reverse order, depending upon the functionality involved.

Based on the above processes shown in FIGS. 13-18, the following modifications may be made to current technical specifications. For example, 3GPP TS 23.682 may specify that the SCEF shall transfer SCS/AS ID or APN to the HSS (via s6t interface) or to the PCRF (via Nt interface) together with event configuration to enable the HSS/PCRF to identify the corresponding APN. 3GPP TS 29.336 may specify a new SCS/AS ID information element or APN information element in Configuration-Information-Request (CIR) command for S6t interface. 3GPP TS 29.272 may specify a new APN information element in Insert-Subscriber-Data (ISD) and Update-Location-Answer (ULA) command for S6a/S6d interface. 3GPP TS 29.154 may specify a new SCS/AS ID information element or APN information element in the Event-Configuration-Request (ECR) command for Nta application of Nt interface. 3GPP TS 29.122 may specify a new IP domain information element in the Event Monitoring API. 3GPP TS 23.502 may specify the additional event filter data (i.e. DNN+S-NSSAI) in AMF and UDM event exposure services. 3GPP TS 29.505, 29.503 and 29.518 may specify the corresponding impact due to this event filter data applicable for event "COMMUNICATION FAILURE". Note that when the principle of the present disclosure is applied to 5G CN, the Diameter command and attribute value pairs (AVPs) may be replaced by corresponding messages and information elements defined in 5G. The term "Diameter" refers to an authentication, authorization, and accounting protocol for computer networks.

Figure 19:
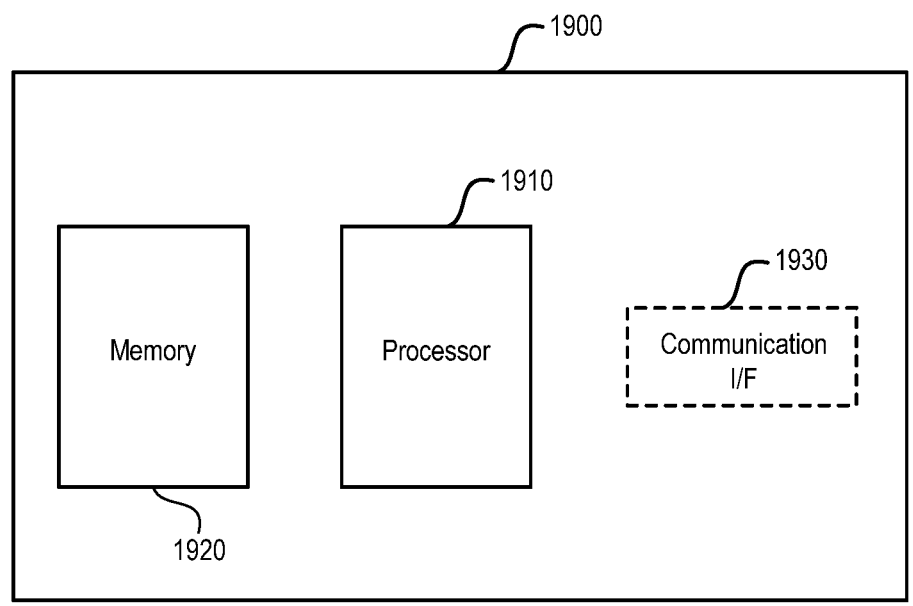
FIG. 19 is a block diagram showing an apparatus suitable for use in practicing some embodiments of the disclosure.

FIG. 19 is a block diagram showing an apparatus suitable for use in practicing some embodiments of the disclosure. For example, any one of the network exposure node, the subscriber management node, the mobility management node and the policy decision node described above may be implemented through the apparatus 1900. As shown, the apparatus 1900 may include a processor 1910, a memory 1920 that stores a program, and optionally a communication interface 1930 for communicating data with other external devices through wired and/or wireless communication.

The program includes program instructions that, when executed by the processor 1910, enable the apparatus 1900 to operate in accordance with the embodiments of the present disclosure, as discussed above. That is, the embodiments of the present disclosure may be implemented at least in part by computer software executable by the processor 1910, or by hardware, or by a combination of software and hardware.

The memory 1920 may be of any type suitable to the local technical environment and may be implemented using any suitable data storage technology, such as semiconductor based memory devices, flash memories, magnetic memory devices and systems, optical memory devices and systems, fixed memories and removable memories. The processor 1910 may be of any type suitable to the local technical environment, and may include one or more of general purpose computers, special purpose computers, microprocessors, digital signal processors (DSPs) and processors based on multi-core processor architectures, as non-limiting examples.

Figure 20:
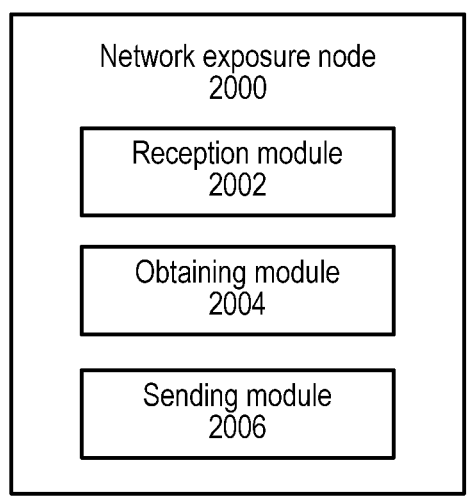
FIG. 20 is a block diagram showing a network exposure node according to an embodiment of the disclosure.

FIG. 20 is a block diagram showing a network exposure node according to an embodiment of the disclosure. As shown, the network exposure node 2000 comprises a reception module 2002, an obtaining module 2004 and a sending module 2006. The reception module 2002 may be configured to receive, from a server, a first request for monitoring communication failure for at least one terminal device, as described above with respect to block 202. The obtaining module 2004 may be configured to obtain a connection ID for identifying a connection between the at least one terminal device and the server, based on the received first request, as described above with respect to block 204. The sending module 2006 may be configured to send, to a subscriber management node or a policy decision node, a second request for monitoring communication failure for the at least one terminal device, as described above with respect to block 206. The second request includes the obtained connection ID.

Figure 21:
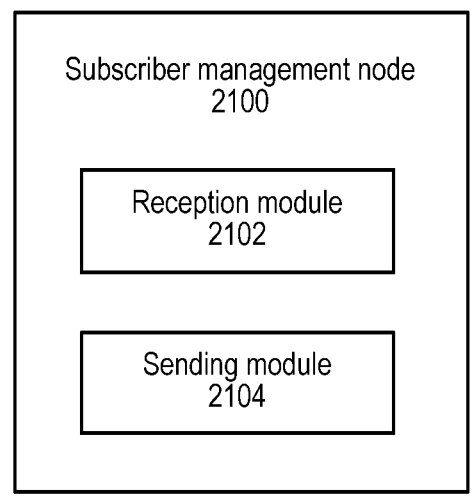
FIG. 21 is a block diagram showing a subscriber management node according to an embodiment of the disclosure.

FIG. 21 is a block diagram showing a subscriber management node according to an embodiment of the disclosure. As shown, the subscriber management node 2100 comprises a reception module 2102 and a sending module 2104. The reception module 2102 may be configured to receive, from a network exposure node, a request for monitoring communication failure for at least one terminal device, as described above with respect to block 502. The request includes a connection ID for identifying a connection between the at least one terminal device and a server subscribing to the monitoring. The sending module 2104 may be configured to send, to a mobility management node, an instruction for monitoring communication failure for the at least one terminal device, as described above with respect to block 504. The instruction includes the connection ID.

Figure 22:
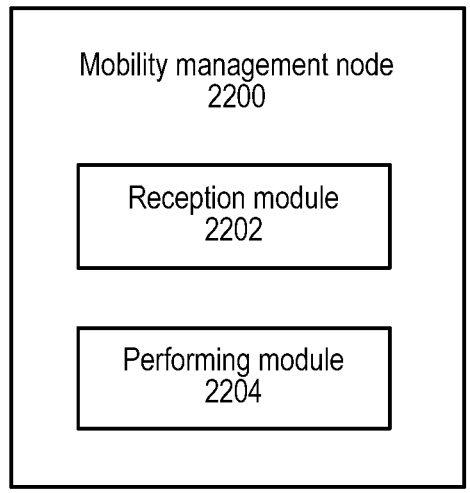
FIG. 22 is a block diagram showing a mobility management node according to an embodiment of the disclosure.

FIG. 22 is a block diagram showing a mobility management node according to an embodiment of the disclosure. As shown, the mobility management node 2200 comprises a reception module 2202 and a performing module 2204. The reception module 2202 may be configured to receive, from a subscriber management node, an instruction for monitoring communication failure for a terminal device, as described above with respect to block 602. The instruction includes a connection ID for identifying a connection between the terminal device and a server subscribing to the monitoring. The performing module 2204 may be configured to perform a monitoring procedure for the connection identified by the connection ID such that a monitoring report associated with the connection ID is provided to the subscriber management node, as described above with respect to block 604.

Figure 23:
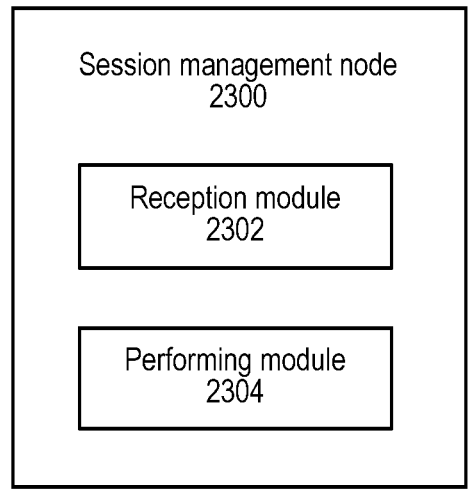
FIG. 23 is a block diagram showing a session management node according to an embodiment of the disclosure.

FIG. 23 is a block diagram showing a session management node according to an embodiment of the disclosure. As shown, the session management node 2300 comprises a reception module 2302 and a performing module 2304. The reception module 2302 may be configured to receive, from a mobility management node or a subscriber management node, a request for monitoring communication failure for a terminal device, as described above with respect to block 902. The request includes a second ID for identifying a connection between the terminal device and a server subscribing to the monitoring. The performing module 2304 may be configured to perform a monitoring procedure for the connection identified by the second ID such that a monitoring report associated with the second ID is provided to a network exposure node, as described above with respect to block 904.

Figure 24:
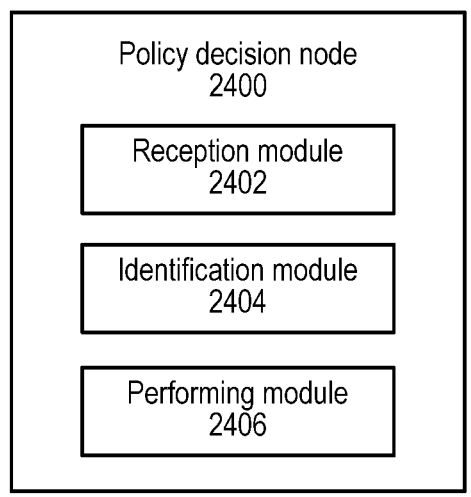
FIG. 24 is a block diagram showing a policy decision node according to an embodiment of the disclosure.

FIG. 24 is a block diagram showing a policy decision node according to an embodiment of the disclosure. As shown, the policy decision node 2400 comprises a reception module 2402, an identification module 2404 and a performing module 2406. The reception module 2402 may be configured to receive, from a network exposure node, a request for monitoring communication failure for multiple terminal devices, as described above with respect to block 802. The request includes a connection ID for identifying connections between the multiple terminal devices and a server subscribing to the monitoring. The identification module 2404 may be configured to identify, for a terminal device from the multiple terminal devices, a corresponding policy enforcement node and the connection between the terminal device and the server, based on the connection ID, as described above with respect to block 804. The performing module 2406 may be configured to perform a monitoring procedure for the identified connection via the corresponding policy enforcement node such that a monitoring report associated with the connection ID is provided to the network exposure node, as described above with respect to block 806. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a network exposure node of a 3rd Generation Partnership Project (3GPP) wireless communication network, the method comprising:
   receiving, from a server, a first request for monitoring an event of communication failure for a terminal device, wherein the first request comprises an Internet protocol (IP) address and an IP domain of the terminal device to identify the terminal device;
   obtaining a connection identity (ID) for identifying a connection between the terminal device and the server, based on the received first request from the server; and
   sending, to a subscriber management node or a policy decision node, a second request for monitoring the event of communication failure between the terminal device and the server, wherein the second request includes the connection ID and wherein:
      the server is a service capability server (SCS) or an application server (AS), in which the connection ID is an access point name (APN); or
      the server is an application function (AF), in which the connection ID is a combination of a data network name (DNN) and a single network slice selection assistance information (S-NSSAI).

2. The method according to claim 1, wherein the first request further includes an ID of the server and wherein obtaining the connection ID comprises determining the connection ID based on the ID of the server.

3. The method according to claim 2, wherein the ID of the server is an SCS/AS ID and wherein each of the first request and the second request is a Monitoring Request message.

4. The method according to claim 2, wherein the ID of the server is an AF ID.

5. A method implemented at a subscriber management node, the method comprising:
   receiving, from a network exposure node of a 3rd Generation Partnership Project (3GPP) wireless communication network, a request for monitoring an event of communication failure for a terminal device, wherein the request includes a connection identity (ID) for identifying a connection between the terminal device and a server subscribing to the monitoring the event of communication failure, and wherein the network exposure node obtains the connection ID based on a request from the server to monitor the event of communication failure, in which the request from the server comprises an Internet protocol (IP) address and an IP domain of the terminal device to identify the terminal device; and
   sending, to a mobility management node or a session management node, an instruction for monitoring communication failure between the terminal device and the server, wherein the instruction includes the connection ID or a second ID, wherein the second ID is associated with the connection ID and identifies the connection between the terminal device and the server and wherein:
      the server is a service capability server (SCS) or an application server (AS), in which the connection ID is an access point name (APN); or
      the server is an application function (AF), in which the connection ID is a combination of a data network name (DNN) and a single network slice selection assistance information (S-NSSAI).

6. The method according to claim 5, wherein the connection is a protocol data unit (PDU) session and the second ID is a PDU session ID.

7. The method according to claim 5, wherein the request is a Monitoring Request message, and the instruction is an Insert Subscriber Data Request message or an Update Location Answer message.

8. The method according to claim 5, wherein the request includes an ID of the terminal device and wherein the second ID and the session management node are determined by the subscriber management node based on the connection ID and the ID of the terminal device.

9. The method according to claim 8, wherein the connection is a protocol data unit (PDU) session and the second ID is a PDU session ID.

10. A network exposure node of a 3rd Generation Partnership Project (3GPP) wireless communication network, comprising:
    at least one processor; and
    at least one memory, the at least one memory containing instructions executable by the at least one processor to cause the network exposure node to:
       receive, from a server, a first request for monitoring an event of communication failure for a terminal device, wherein the first request comprises an Internet protocol (IP) address and an IP domain of the terminal device to identify the terminal device;
       obtain a connection identity (ID) for identifying a connection between the terminal device and the server, based on the received first request from the server; and
       send, to a subscriber management node or a policy decision node, a second request for monitoring the event of communication failure between the terminal device and the server, wherein the second request includes the connection ID and wherein:
          the server is a service capability server (SCS) or an application server (AS), in which the connection ID is an access point name (APN); or
          the server is an application function (AF), in which the connection ID is a combination of a data network name (DNN) and a single network slice selection assistance information (S-NSSAI).

11. The network exposure node according to claim 10, wherein the first request further includes an ID of the server and wherein obtaining the connection ID comprises determining the connection ID based on the ID of the server.

12. The network exposure node according to claim 11, wherein the ID of the server is an SCS/AS ID and wherein each of the first request and the second request is a Monitoring Request message.

13. The network exposure node according to claim 11, wherein the ID of the server is an AF ID.

* * * * *